United States Patent [19]
von Hagen

[11] Patent Number: 5,813,256
[45] Date of Patent: Sep. 29, 1998

[54] THEFT DETERRENT LOCK FOR AN AIR BRAKE CONTROL VALVE

[76] Inventor: Arthur von Hagen, 1163 Beach Ave., Bronx, N.Y. 10472

[21] Appl. No.: 687,054

[22] Filed: Aug. 7, 1996

[51] Int. Cl.$^6$ .................................................. F16K 35/00
[52] U.S. Cl. ................................. 70/177; 70/54; 70/167
[58] Field of Search .............................. 70/2, 18, 54–56, 70/207, 208, 229, 230, 232, 163–169, 175–180, 53

[56] References Cited

U.S. PATENT DOCUMENTS

| | | | |
|---|---|---|---|
| 1,120,117 | 12/1914 | Anderson et al. | 70/53 X |
| 1,251,591 | 1/1918 | Stoddart | 70/202 |
| 1,316,450 | 9/1919 | Karasch | 70/201 |
| 1,486,037 | 3/1924 | Rousseau | 70/53 X |
| 1,542,106 | 6/1925 | Spencer | 70/54 X |
| 1,815,417 | 7/1931 | Miller . | |
| 2,924,960 | 2/1960 | Palazo | 70/53 X |
| 3,453,846 | 7/1969 | Owen et al. | 70/54 |
| 3,475,931 | 11/1969 | Foote | 70/54 |
| 3,759,557 | 9/1973 | Athas | 70/54 X |
| 4,003,228 | 1/1977 | Lievens et al. | 70/18 X |
| 4,043,159 | 8/1977 | Malacheski et al. | 70/53 X |
| 4,069,692 | 1/1978 | Hemphill | 70/212 X |
| 4,269,048 | 5/1981 | McDorman | 70/13 |
| 4,277,961 | 7/1981 | Williams | 70/54 |
| 4,543,984 | 10/1985 | Murray | 137/385 |
| 4,587,814 | 5/1986 | Wilson | 70/164 X |
| 4,745,783 | 5/1988 | Poe | 70/2 |
| 4,872,327 | 10/1989 | Wagner | 70/54 X |
| 4,953,371 | 9/1990 | Appelbaum | 70/53 X |
| 5,027,626 | 7/1991 | Appelbaum | 70/164 |
| 5,063,763 | 11/1991 | Johnson | 70/58 |
| 5,152,160 | 10/1992 | Lentini | 70/54 X |
| 5,214,945 | 6/1993 | Martin | 70/167 X |
| 5,375,916 | 12/1994 | Cook | 70/177 X |
| 5,410,894 | 5/1995 | Fox et al. | 70/168 X |
| 5,542,273 | 8/1996 | Bednarz | 70/164 X |

FOREIGN PATENT DOCUMENTS

| | | | |
|---|---|---|---|
| 1260582 | 2/1968 | Germany | 70/54 |
| 1205190 | 9/1970 | United Kingdom | 70/53 |

*Primary Examiner*—Suzanne Dino
*Attorney, Agent, or Firm*—Frishauf, Holtz, Goodman, Langer & Chick

[57] ABSTRACT

An anti-theft device for use with a dashboard mounted control of the type typically found in trucks having an axially moving shaft with a hand-grip knob is provided. The anti-theft device includes a locking pin provided through an aperture of the shaft. The anti-theft device also includes a locking device having a base and a shackle portion. The shackle portion is at least partially removably coupled to the base portion. The base has a first coupling device adapted to receive a first end of the locking pin. The shackle includes a second coupling device adapted to receive the second end of the locking pin. When the first end of the locking pin is received in the first coupling device and the second end of the locking pin is received in the second coupling device, and when the shackle portion is coupled to the base portion, the locking means substantially prevents inward axial movement of the shaft.

20 Claims, 9 Drawing Sheets

THEFT DETERRENT LOCK FOR AN AIR BRAKE CONTROL VALVE

BACKGROUND OF THE INVENTION

1. Field of the Invention

The present invention relates to a locking device for attachment to a vehicular control when a vehicle is parked, and more particularly to an anti-theft device for preventing the manipulation of a driver controlled valve controlling the air brakes of a vehicle.

2. Description of the Prior Art

Various forms of steering wheel locking devices have become increasingly popular in recent years. These steering wheel locking devices serve as anti-theft/theft deterrent mechanisms. While the steering wheel locking devices were initially intended for use on passenger vehicles, they are now also employed in trucks including tractor trailers.

It has been recently found that the steering wheel locking devices can be neutralized by a thief, thereby enabling theft of the vehicle. When a steering wheel locking device of a truck is disabled by a thief and the truck is stolen, the owner not only has to replace the vehicle, but also the goods that were contained in the cargo area. When a tractor trailer is stolen, this can amount to a great deal of money. In order to inhibit theft of trucks and their goods, an additional anti-theft/theft deterrent device is required.

Large trucks such as tractor trailers are typically provided with an air braking system wherein air under pressure is supplied through an air line to actuate a frictional braking mechanism. The air line has a diaphragm which, when actuated, actuates the brakes to create friction, reducing the speed and ultimately stopping the truck. When fully engaged when the truck is at a standstill, the air brakes can substantially inhibit movement of the vehicle. Therefore, when the truck is parked, the air brakes are engaged to prevent movement of the truck.

U.S. Pat. No. 5,375,916 (Cook), the disclosure of which is incorporated by reference herein, teaches an anti-theft device for preventing air brake control valves from being manipulated when a vehicle is parked. A clamp assembly, including a pair of blocks, engages valve knobs to prevent the release of the air brakes so the truck cannot be readily stolen. The anti-theft device described in U.S. Pat. No. 5,375,916 clamps about the valve knob that is attached to the valve shaft. A drawback of this design is that the device is relatively bulky and that the valve knob is susceptible to deformation by a thief such that the anti-theft device may be removed by the thief. A further drawback of this device is that two valve knobs which are required to secure the device are not always proximally located or spaced to enable use of the device.

OBJECTS AND SUMMARY OF THE INVENTION

It is an object of the present invention to provide a vehicular anti-theft device that prevents operation of an air brake control valve when attached thereto.

It is another object of the present invention to provide a vehicular anti-theft device that cannot be easily compromised.

It is yet another object of the present invention to provide a vehicular anti-theft device that is compact and yet effectively prevents operation of an air brake release control valve to which the anti-theft device is attached.

It is a further object of the present invention to provide a vehicular anti-theft device which substantially prevents the disengagement of the air brakes of a truck.

It is still a further object of the present invention to provide a vehicular anti-theft device which prevents movement or theft of a vehicle having air brakes by preventing the air brakes from being disengaged.

It is still another object of the present invention to provide a theft deterrent lock for an air brake control valve which overcomes inherent disadvantages of known theft deterrent locks.

In accordance with one form of the present invention, an anti-theft device for use with a vehicular control device having an inward and outward axially moving shaft includes a locking pin having at least one end extending from the shaft. The anti-theft device also includes a locking device removably coupled about the shaft for engaging the locking pin to substantially prevent an inward axial movement of the shaft.

In a specific embodiment, the locking device includes a base and a shackle portion. The shackle has first and second ends adapted for coupling to the base. The base includes a raised portion adapted to receive a first end of the locking pin and the shackle portion includes a recessed portion adapted to receive a second end of the locking pin.

In another specific embodiment, the base includes a recessed portion adapted to receive the first end of the locking pin and the shackle portion includes a raised portion adapted to receive the second end of the locking pin.

In another embodiment of the invention, an anti-theft device for use with a dashboard-mounted control device of the type typically found in trucks having a shaft mounted for axial movement relative to the dashboard from an extended to an unextended position wherein the shaft includes a locking pin extending therefrom includes locking means adapted for removable coupling to the shaft. The locking means has a base and a shackle portion. The shackle portion has first and second ends adapted for coupling to the base. The locking means further includes at least one of a first coupling device attached to the base which is adapted to receive the first end of the locking pin, and a second coupling device attached to the shackle portion which is adapted to receive the second end of the locking pin. When the shaft is in an extended position and when either the first end of the locking pin is received in the first coupling device or the second end of the locking pin is received in the second coupling device, and when the first and second ends of the shackle are coupled to the base, the locking means substantially prevents axial movement of the shaft to the unextended position.

In another embodiment of the present invention, the anti-theft device for use with a dashboard-mounted control device of the type typically found in trucks having a shaft mounted for axial movement relative to the dashboard from an extended position to an unextended position wherein the shaft has an aperture therethrough, includes locking means adapted for removable coupling about the shaft. The locking means includes a base and a shackle portion. The shackle portion includes first and second ends adapted for coupling to the base. The base includes a first coupling device. The shackle portion has a locking pin formed integrally therewith, and the aperture of the shaft is adapted to receive a locking pin. The first coupling device of the base is adapted to receive a portion of the locking pin when the locking pin is provided through the shaft aperture. When the shaft is in an extended position and the locking pin is provided through the aperture of the shaft, and when the locking pin is received in the first coupling device and the first and second ends of the shackle portion are coupled to the base, the locking device substantially prevents axial movement of the shaft to the unextended position.

In yet another embodiment of the present invention, an anti-theft device for use with a dashboard-mounted control device of the type typically found in trucks having a shaft mounted for axial movement relative to the dashboard from an extended position to an unextended position, wherein the shaft has an aperture therethrough, includes a locking device adapted for removable coupling about the shaft. The locking means includes a base and a shackle portion. The shackle portion has first and second ends adapted for coupling to the base. The base includes a locking pin formed integrally therewith, and the aperture of the shaft is adapted to receive the locking pin. The shackle portion has a second coupling device adapted to receive a locking pin when the locking pin is provided through the shaft. When the shaft is in an extended position and the locking pin is provided through the shaft, and when the locking pin is received in the second coupling device, and when the first and second ends of the shackle portion are coupled to the base, the locking means substantially prevents an axial movement of the shaft to the unextended position.

A preferred form of the theft deterrent lock for an air brake control valve, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENT

Referring now to the drawings, an anti-theft device 10 for use with a vehicular control device 12 is shown. The vehicular control device 12, such as an air brake control device of a truck, is typically mounted to the dashboard 14 of the truck. However, these vehicular control devices can be located anywhere within the driver's compartment (i.e., cab) of the truck or on the truck. The control device 12 preferably includes a shaft 16 (FIG. 3) having first and second axially opposite ends. The dashboard 14 is preferably adapted to permit a first end of the shaft 16 to extend therethrough to connect with an actuating mechanism such as the valve member 17 (FIG. 4) of the air brake. The vehicular control device 12 includes a threaded member 18 connected to the valve portion of the air brake. The threaded member 18 is adapted to receive a nut 20 or similar locking means to secure the vehicular control device 12 and its associated mounting plate 22 in relation to the dashboard 14. The threaded member 18 is preferably adapted to extend through the dashboard (FIG. 4) so as to receive a nut 21 or similar locking means. The threaded member 18 and nuts 20, 21 are adapted to be used in combination to adjust to the thickness of dashboard 14 so as to secure device 12 to the dashboard. A hand-grip knob 24 is also provided over the second end the shaft 16 for ease of manipulation of the shaft by a user.

Figure 2:
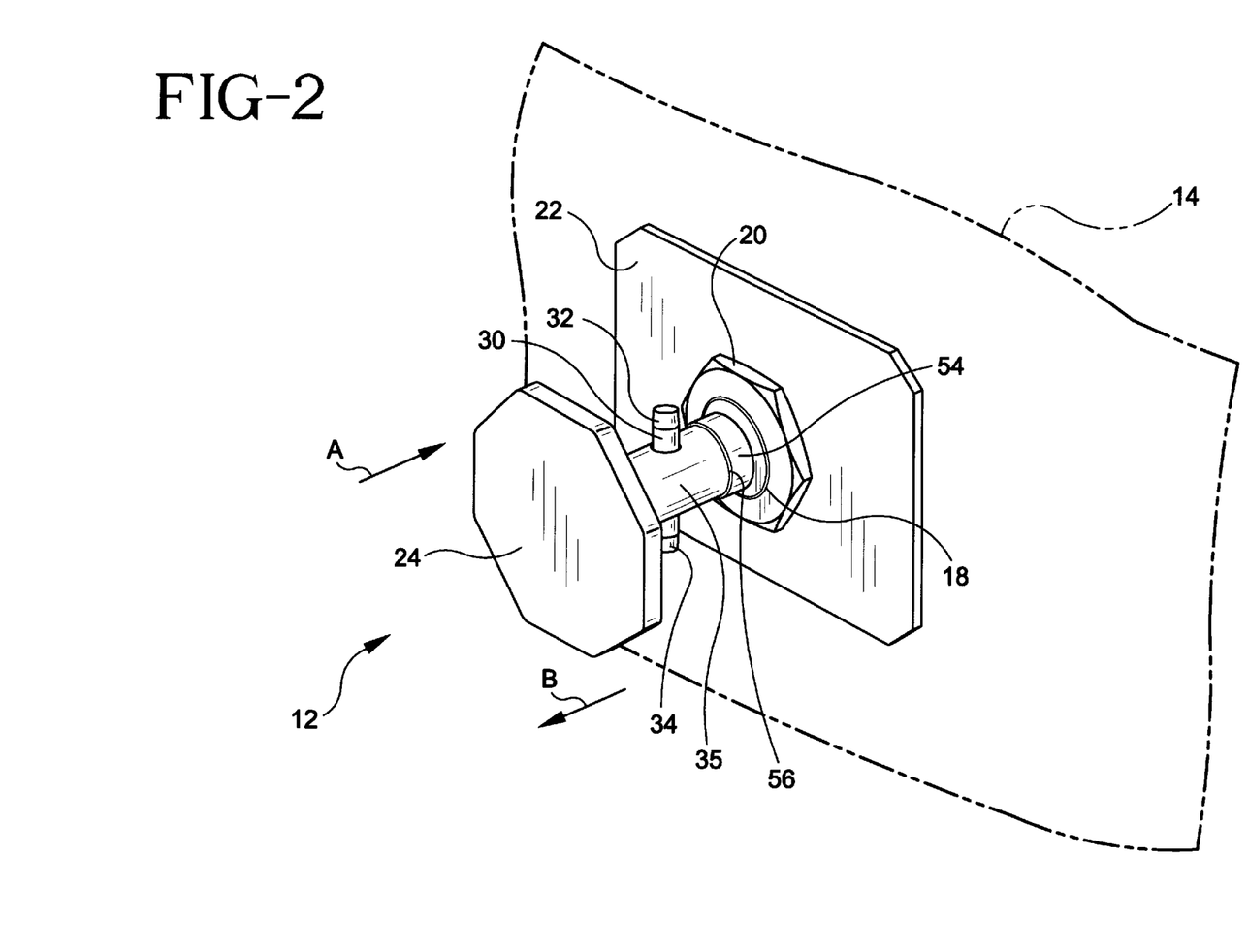
FIG. 2 is a perspective view of an air brake control device and locking pin to which the theft deterrent lock is coupled.
Figure 3:
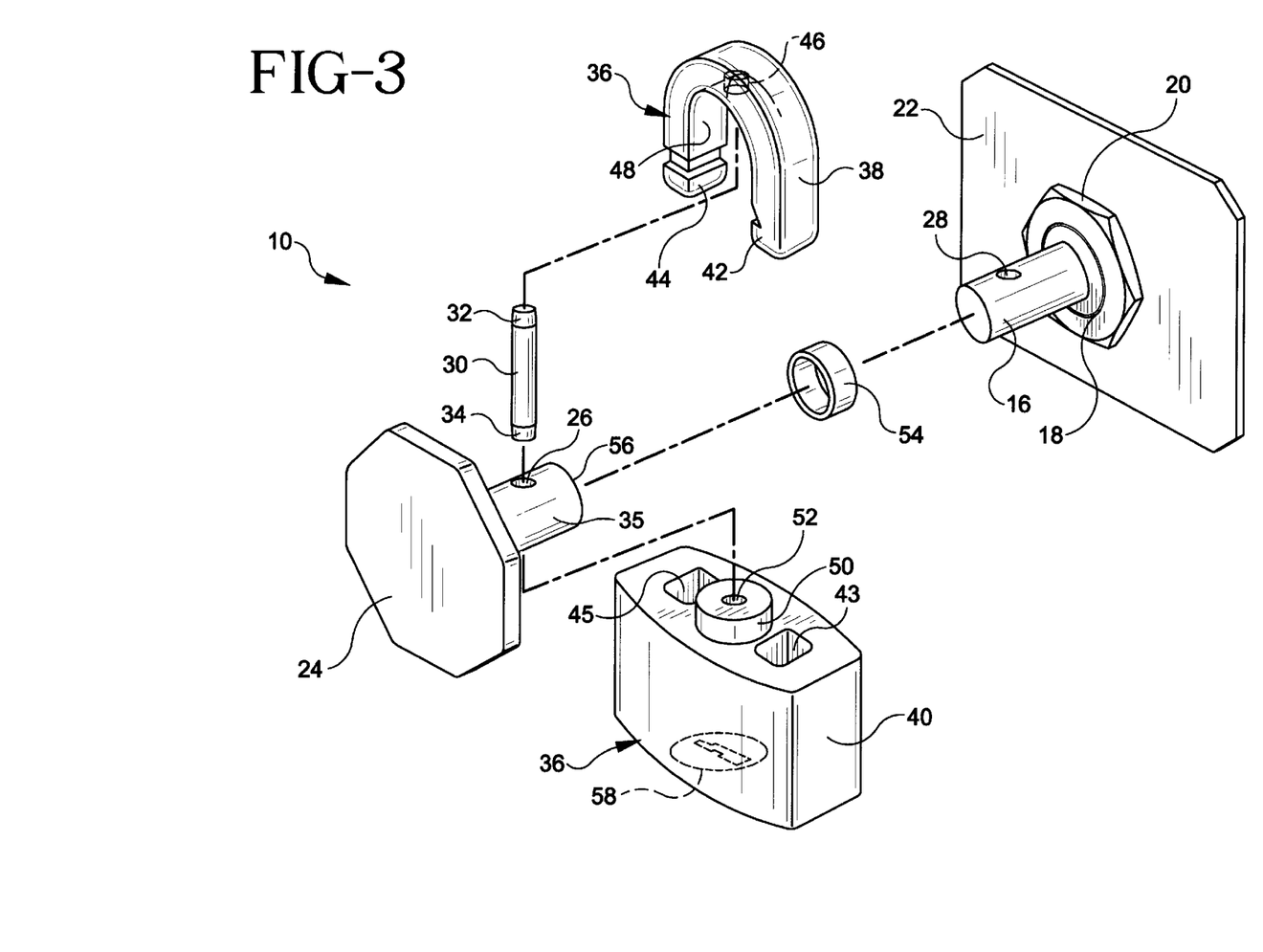
FIG. 3 is an exploded perspective view of an air brake control device and theft deterrent lock of the present invention.
Figure 4:
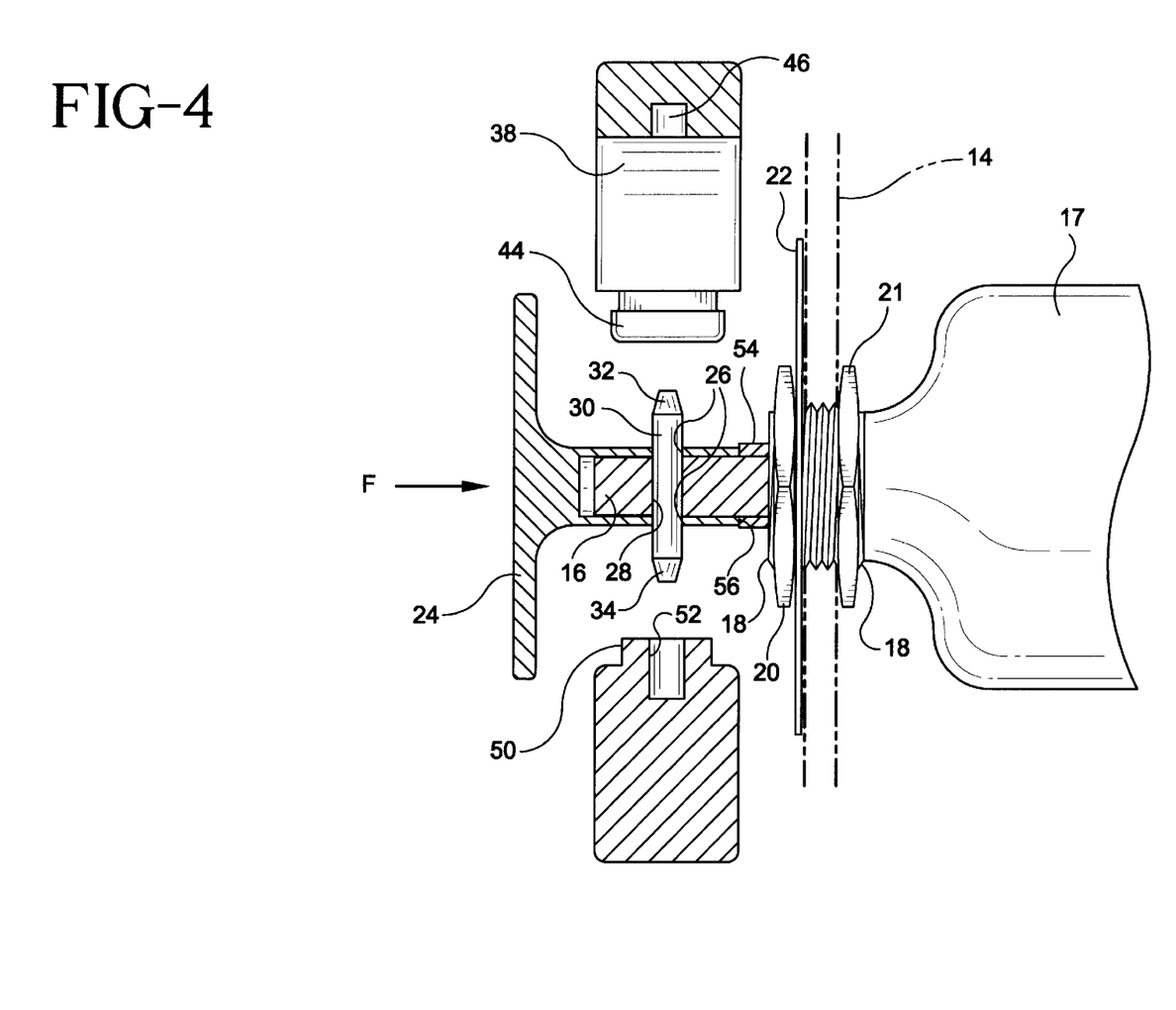
FIG. 4 is a side cross-sectional view of the air brake control device having a theft deterrent lock wherein the theft deterrent lock is in an unsecured position.

As shown in FIG. 3, the hand-grip knob 24 and shaft 16 preferably have apertures 26, 28 respectively therethrough. The apertures 26, 28 are aligned as shown in FIGS. 2 and 4 and a locking pin 30 is provided to assist in securing the hand-grip knob 24 to the shaft 16. Preferably, the locking pin 30 has first and second ends 32, 34 which extend (i.e., protrude) from the shaft 16 from substantially opposite sides thereof as shown in FIG. 2. It is foreseen that aperture 26 need not be provided through the hand-grip knob 24 if neck 35 of the hand-grip knob is configured such that the neck 35 does not encounter (i.e. cover) aperture 28 of shaft 16.

As known in the art, the air brake control device 12 is typically engaged by axially moving the shaft 16 in the direction indicated by arrow B (see FIG. 2) and is disengaged by applying force F (FIGS. 4 and 5) to axially move shaft 16 in the direction indicated by arrow A (see FIG. 2).

Figure 1:
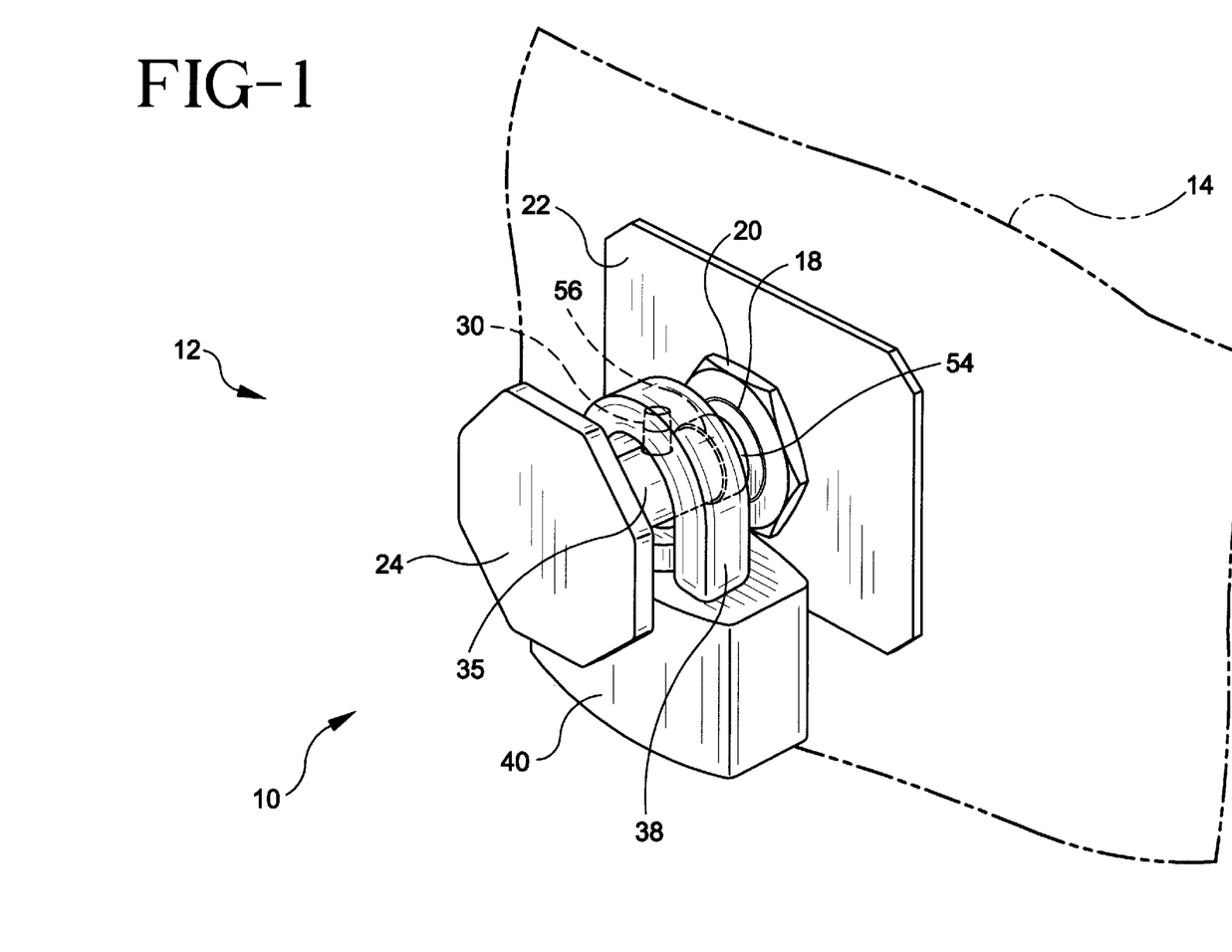
FIG. 1 is a perspective view of an air brake control device having a theft deterrent lock of the present invention attached thereto.

Referring now to FIGS. 1 and 3, the anti-theft device 10 includes a locking means 36, such as a padlock-type device, having a shackle 38 and a base 40. The shackle 38 is preferably U-shaped having first and second ends 42, 44. Shapes other than U-shaped shackles may be employed. The first end 42 of the shackle 38 is preferably pivotably mounted via aperture 43 to the base 40, while the second end 44 is preferably adapted for removable coupling via aperture 45 to the base 40. It is foreseen that the first and second ends 42, 44 of the shackle may be, but are not limited to, either being pivotally mounted, axially mounted or removably mounted to base 40.

The shackle 38 of the anti-theft device 10 preferably includes a coupling device such as a recessed portion 46. As shown in FIG. 3, the recessed portion 46 is preferably located on and through at least a portion of an inner surface 48 of the shackle 38. The recessed portion 46 is preferably configured to receive therein at least a portion of the first end 32 of the locking pin 30.

The base 40 of the anti-theft device 10 preferably includes a coupling device such as a raised portion 50. The raised portion 50 also includes a notch 52 adapted to receive at least a portion of the second end 34 of the locking pin 30. The raised portion 50 is preferably positioned on the base 40 such that when the first and second ends 42, 44 of the shackle 38 are coupled to the base 40, the notch 52 and the recessed portion 46 are substantially axially aligned. The shackle 38 is preferably dimensioned (i.e., has a radius of curvature) such that the second end 34 is retained in the notch 52 while the first end 32 is retained in the recessed portion 46 when the first and second ends 42, 44 of the shackle 38 are coupled to the base 40.

The anti-theft device 10 of the present invention substantially prevents an inward axial movement of the vehicular control device 12. If a user applies force F (FIGS. 4 and 5) in an attempt to push the hand-grip knob 24 in the direction of the dashboard 14 (i.e., direction of arrow A shown in FIG. 2) when the locking device 36 is coupled to the locking pin and when both ends 42, 44 of the shackle 38 are coupled to the base 40, the locking device 36 engages the mounting plate 22 and/or nut 20 preventing further inward axial movement of the shaft 16. Preferably, the locking pin 30 is positioned along the shaft such that when the locking device 36 (i.e., shaft and base) is coupled to the locking pin 30, the shaft 16 is prevented from inward movement a distance sufficient to disengage the actuating mechanism (i.e., valve) of the vehicular control device 12. As a result, the vehicular control device is maintained in its engaged position.

In operation, once a user parks the vehicle which contains a vehicular control device 12 (such as an air brake control), the user preferably pulls the hand-grip knob 24 in the direction of the user (i.e., direction of arrow B shown in FIG. 2). This action engages the air brakes of the vehicle. Thereafter, the user provides one end of the locking pin 30 through the shaft aperture 28 and into the notch 52 of the base 40. The opposite end of the locking pin 30 is then provided in the recessed portion 46 of the shackle 38. Some manipulation of the shackle 38 and base 40 may be required in order to engage both ends of the locking pin 30. It is foreseen that the order in which the first and second ends of the locking pin are coupled to the shackle and base may be reversed.

Thereafter, the first and second ends 42, 44 of the shackle are coupled via apertures 43, 45 to the base 40 in a locked position. As a result, the vehicular control device 12 is maintained in the outward position (i.e., the air brakes are engaged). Therefore, even if a steering wheel lock is compromised by a thief and the engine is started, the truck is incapable of movement due to the engagement of the air brakes.

The present invention may also include a bushing or washer 54 or similar device provided on or about the shaft 16 between a terminal end 56 of neck 35 of the hand-grip knob 24 and the mounting plate 22. The bushing 54 is provided to fill a gap between the terminal end 56 of the hand-grip 24 knob and the mounting plate 22 (or nut 20) so that a thief will not be able to cut (i.e., saw) through the shaft 16 without engaging the bushing 54. The bushing 54 is freely rotatable on shaft 16 and is provided so that if a thief tries to cut off the shaft with a hacksaw or similar device, the bushing will rotate with the saw strokes, thus preventing sawing off of the shaft, or at least making the process much more difficult than if the bushing 54 was not present. As a result, the bushing 54 substantially prevents the anti-theft device 10 of the present invention from being compromised.

In the preferred embodiment, the shaft 16, threaded member 18, nuts 20, 21 and bushing 54 are made of hardened steel so that each cannot be easily cut or bent.

Figure 5:
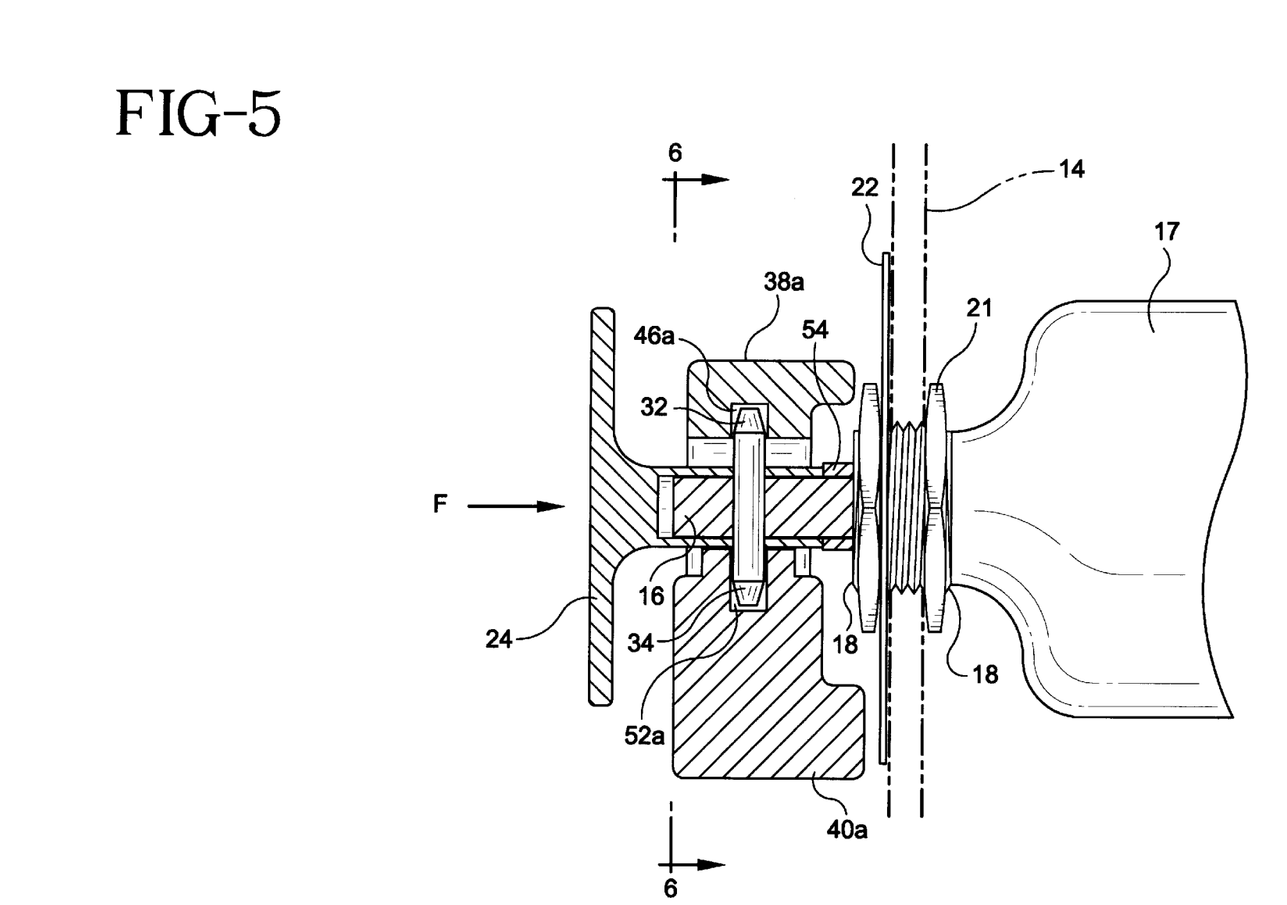
FIG. 5 is a side cross-sectional view of the air brake control device having a theft deterrent lock wherein the theft deterrent lock is in a secured position and showing force F which is applied to disengage the air brake control device.
Figure 6:
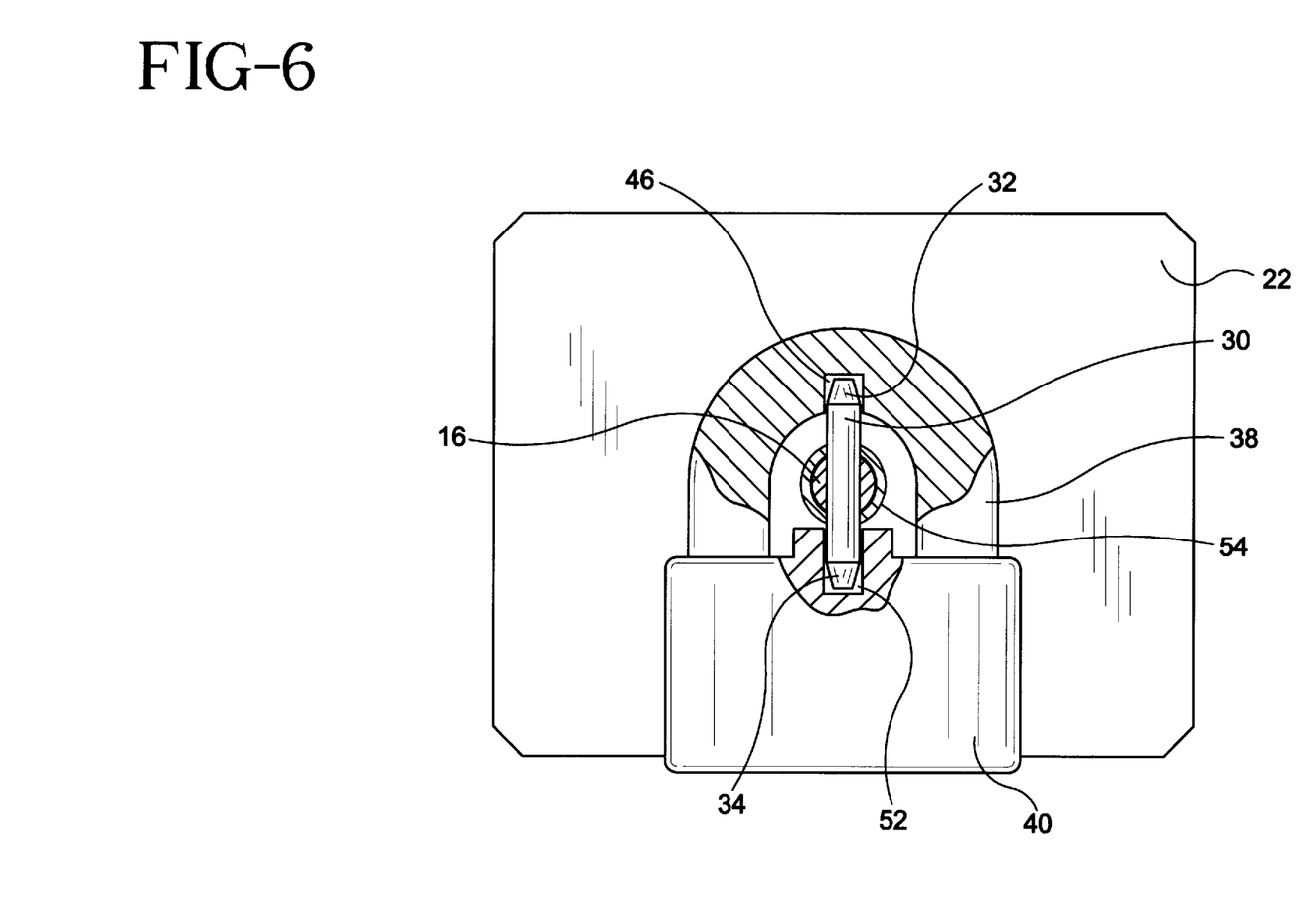
FIG. 6 is a partial cross-sectional view of the air brake control device having a theft-deterrent lock as viewed along lines 6—6 of FIG. 5 wherein the theft deterrent lock is only partially broken away.

In an alternative embodiment as shown in FIG. 5, the shackle 38a and base 40a are configured to substantially extend over bushing 54 and threaded member 18 to prevent (i.e., limit) access to bushing 54 and shaft 16 by a thief.

Figure 7:
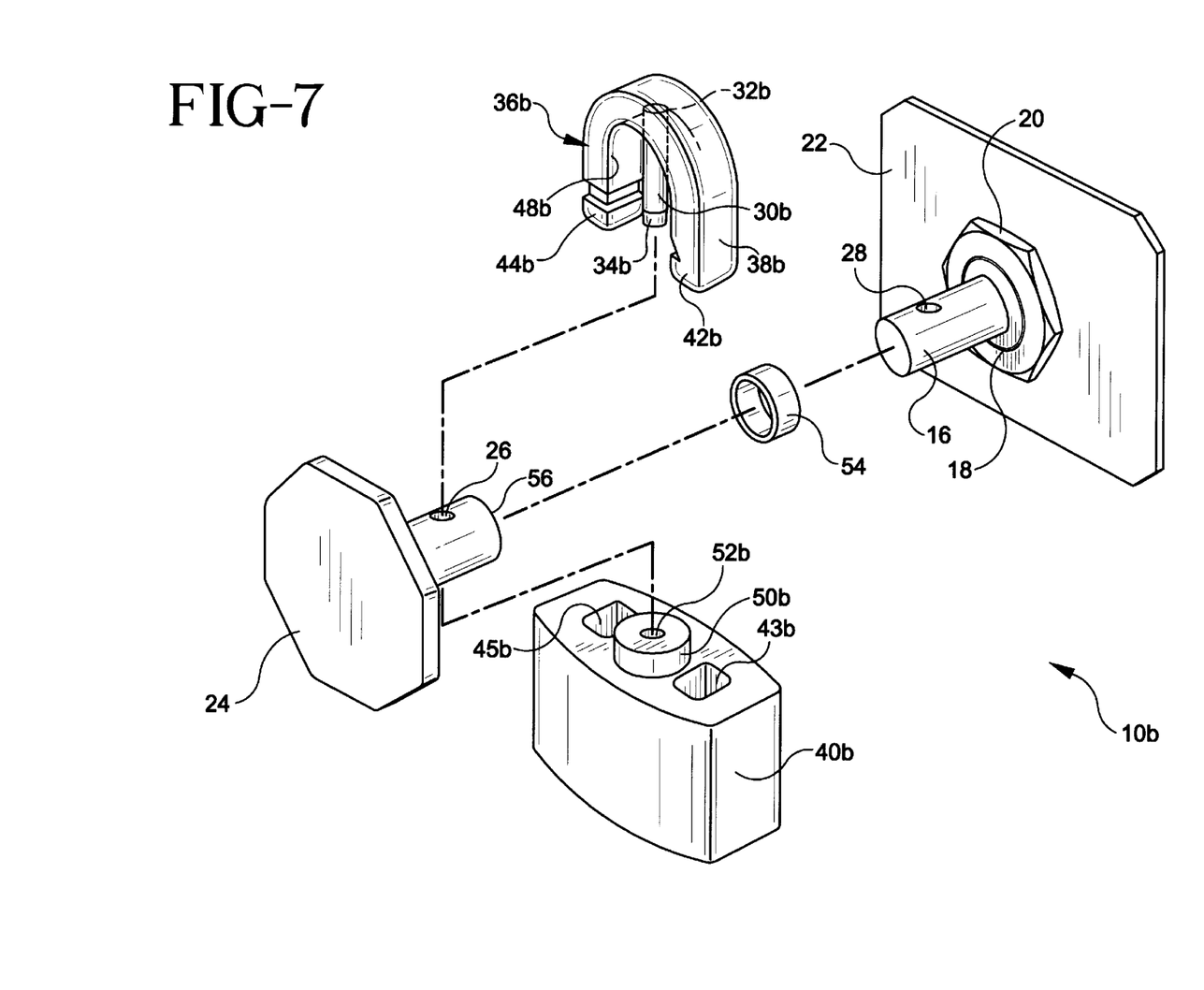
FIG. 7 is an exploded perspective view of an alternative embodiment of the present invention wherein the locking pin is integral with the shackle of the locking device.
Figure 9:
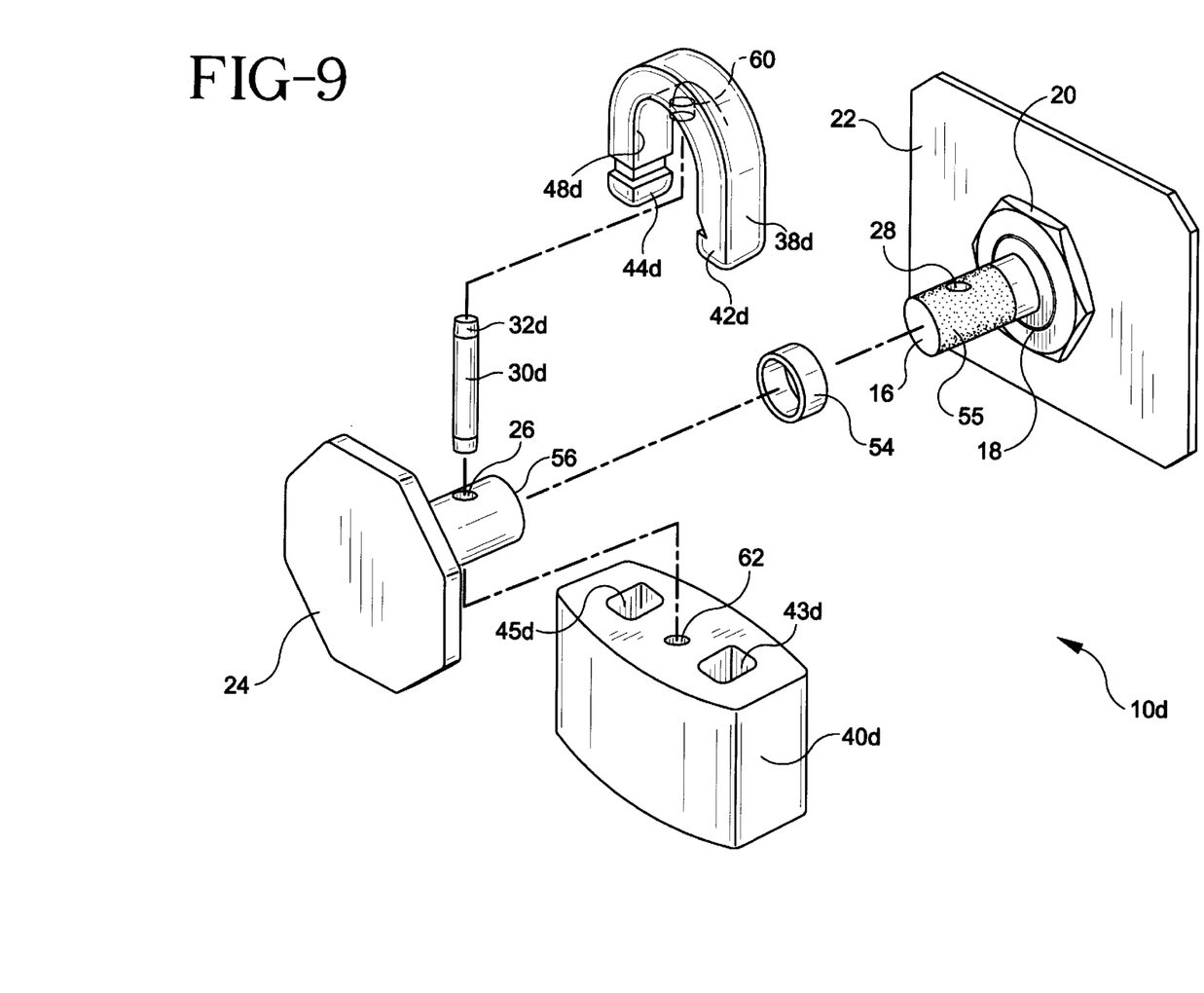
FIG. 9 is an exploded perspective view of yet another embodiment of the present invention.

In an alternative embodiment of the present invention as shown in FIG. 7, the locking pin 30b is integrally formed with the locking means 36b. In this embodiment, the hand-grip knob 24 is coupled to the shaft 16 by means other than the locking pin 30, such as an adhesive 55 (FIG. 9). However, apertures 26, 28 are preferably still respectively formed through the hand-grip knob 24 and the shaft 16. The apertures 26, 28 are appropriately aligned as previously described to accommodate locking pin 30b. In this alternative embodiment, the first end 32b of the locking pin 30b is nonremovably coupled to shackle 38b. In order to utilize the anti-theft device 10b, the shackle 38b and base 40b are manipulated such that the second end 34b of locking pin 30b is provided through aligned apertures 26, 28. The second end 34b of the locking pin 30b is then provided in the notch 52b of the base 40b as previously described. When both the first and second ends 42b, 44b of the shackle 38b are coupled to the base 40b, the locking means substantially prevents inward axial movement of the shaft 16.

Figure 8:
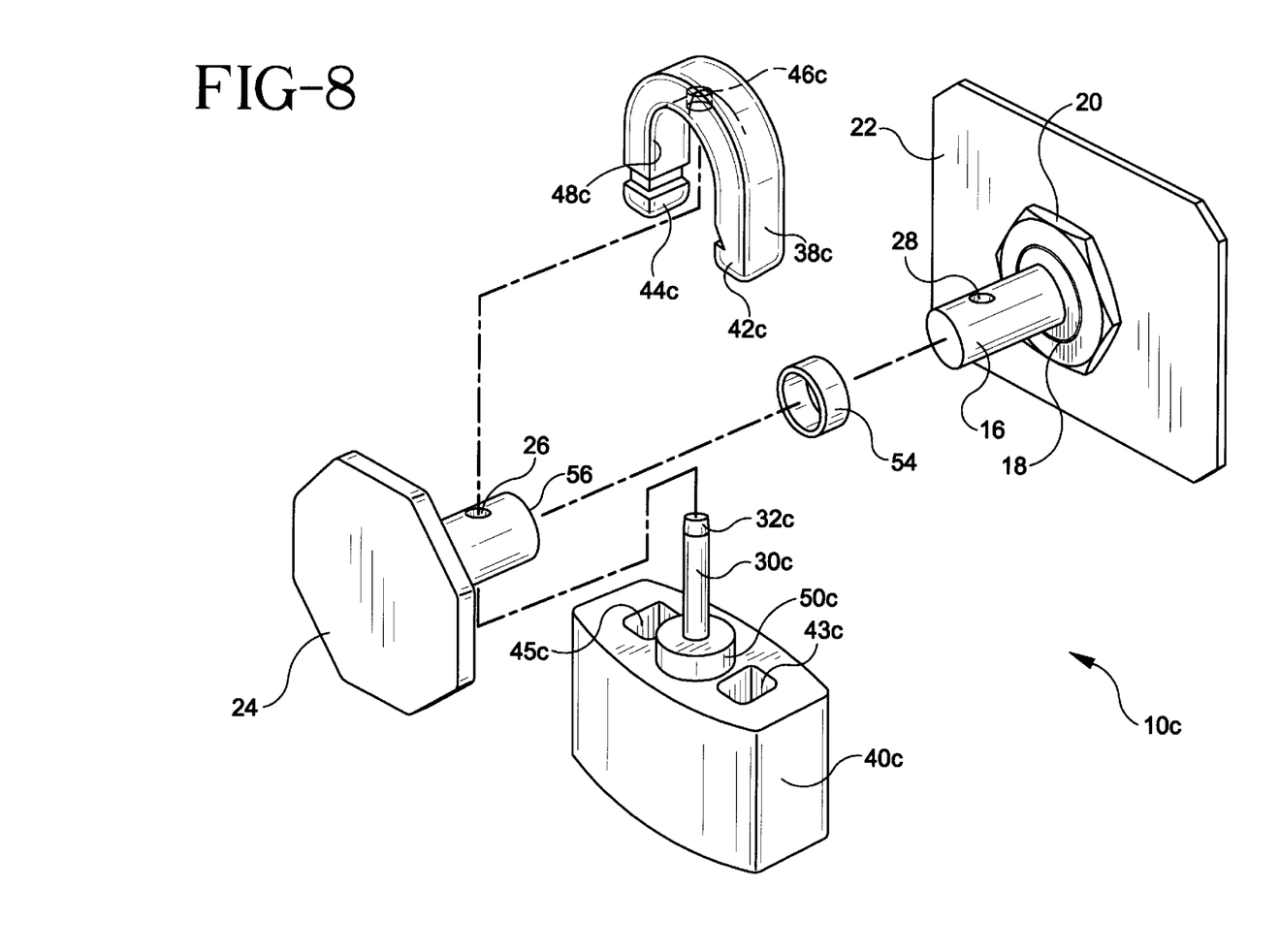
FIG. 8 is an exploded perspective view of another embodiment of the present invention wherein the locking pin is integral with the base of the locking device.

In yet another embodiment of the invention as shown in FIG. 8, it is foreseen that the locking pin 30c is integrally formed and nonremovably coupled to notch 52 of the base 50c. In order to utilize the anti-theft device 10c, the shackle 38c and base 40c are manipulated such that the first end 32c of the locking pin 30c is provided through aligned apertures 26, 28. The first end 32c of the locking pin 30c is then provided in recessed portion 46c of shackle 38c as described above. As previously explained, when both the first and second ends 42c, 44c of the shackle 38c are coupled to the base 40c, the locking device 36c substantially prevents inward axial movement of the shaft 16.

The anti-theft device 10 of the present invention may also include a locking mechanism 58 (shown in phantom in FIG. 3) as known in the art. The mechanical components of the locking mechanism 58 are not shown in the drawings since these are well known in the padlock art. Suitable locking mechanisms include keyed locking mechanisms such as those utilized in connection with currently available padlocks manufactured by Master Lock Co. of Milwaukee, Wis. It is also foreseen that mechanical and electronic combination-type locks are also suitable for use in the present invention. Once the first and second ends 32, 34 of locking pin 30 are positioned within the recessed portion 46 and notch 52 as described, and when the first and second ends of the shackle 38 are coupled to the base 40, the locking mechanism 58 is actuated to securely couple the ends of the shackle to the base. As a result, only the user who has a key or knows the proper combination can unlock the locking mechanism 58 to remove the anti-theft device from the shaft and disengage the vehicular control device.

Referring now to FIG. 9, it is foreseen that the first coupling device of the shackle 38d may comprise a raised portion 60 extending from at least a portion of the inner surface 48d of the shackle. The raised portion 60 may include a notch (not shown in the Figures) adapted to receive therein at least a portion of the first end 32d of the locking pin 30d. It is also foreseen that the second coupling means of the base may comprise a recessed portion 62 located on and through at least a portion of the base 40d. The raised portion 60 and recessed portion 62 are preferably axially aligned when the first and second ends 42d, 44d of the shackle 38d are coupled to the base 40d.

It is also foreseen that the locking pin 30 need not have both its first and second ends 32, 34 extend from shaft 16. In this alternative embodiment, the locking device 30 (i.e., shackle 38 and base 40) is preferably configured such that the one end of the locking pin which extends from the shaft is engaged. In this alternative embodiment the locking device 30 is secured about the shaft 16 such that a thief is unable to manipulate the locking device 30 to disengage the end of the locking pin from the locking device.

As a result of the present invention, a thief will be reluctant to attempt to steal a vehicle equipped with the theft deterrent lock for an air brake control valve. If the thief does attempt to steal a vehicle equipped with the present invention, the thief has an increased risk of being caught because of the additional time required to try to remove the device. Moreover, if the thief attempts to steal the vehicle without removing the theft deterrent lock, he will be substantially unable to move the vehicle because the airbrakes are fully engaged.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. In combination:
   a vehicular control device having an inward and outward axially moving shaft with first and second ends; and
   an anti-theft device an comprising:
      a locking pin extending from said shaft; and
      a locking device adapted for removable coupling about said shaft for engaging said locking pin and substantially preventing said inward axial movement of said shaft.

2. The combination as defined by claim 1, wherein said locking device comprises a base and a shackle portion.

3. The combination as defined by claim 2, wherein said shackle portion comprises a first end pivotally mounted to said base and a second end adapted for removable coupling to said base.

4. The combination as defined by claim 2, wherein said locking device further comprises a locking mechanism assembly for securing in a locked manner said shackle to said base.

5. The combination as defined by claim 1 wherein the locking pin comprises first and second ends extending from said shaft and wherein said locking device engages at least one of said first and second ends of said locking pin.

6. The combination as defined by claim 5, wherein the locking device comprises a base and a shackle portion.

7. The combination as defined by claim 6, wherein said base comprises a first coupling device adapted to receive said first end of said locking pin to substantially prevent said inward axial movement of said shaft.

8. The combination as defined by claim 7, wherein said first coupling device comprises a raised portion on said base.

9. The combination as defined by claim 7, wherein said first coupling device comprises a recessed portion on at least a portion of said base.

10. The combination as defined by claim 6, wherein said shackle portion comprises a second coupling device adapted to receive said second end of said locking pin to substantially prevent said inward axial movement of said shaft.

11. The combination as defined by claim 10, wherein said second coupling device comprises a raised portion on said shackle portion.

12. The combination as defined by claim 10, wherein said second coupling device comprises a recessed portion on said shackle portion.

13. In combination:
    a dashboard-mounted control device of the type typically found in vehicles having a shaft with first and second ends and a hand-grip knob, the shaft being mounted for axial movement relative to said dashboard from an extended position to an unextended position, the shaft including a locking pin extending from said shaft; and
    an anti-theft device comprising:
       a locking device adapted for removable coupling about said shaft, said locking device having a base and a shackle portion, the shackle portion having first and second ends adapted for coupling to said base, the locking device including at least one of a first coupling device attached to said base adapted to receive said locking pin and a second coupling device attached to said shackle portion adapted to receive said locking pin;
       wherein when the shaft is in an extended position, and when said locking pin is received in at least one of said first and second coupling devices, and when said first and second ends of said shackle portion are coupled to said base, said locking device substantially prevents axial movement of said shaft to said unextended position.

14. In combination:
    a vehicular control valve having a shaft capable of axial movement in inward and outward directions, said shaft having a locking pin extending therefrom; and a
    lock for engaging said locking pin and substantially preventing said inward direction of axial movement of said shaft.

15. The combination as defined by claim 14 wherein said lock comprises a base and shackle portion having a first end pivotally mounted to said base, and a second end.

16. The combination as defined by claim 15, wherein said base further comprises a first coupling device adapted to receive at least a portion of said locking pin when said second end of said shackle portion is coupled to said base.

17. The combination as defined by claim 15, wherein said shackle portion further comprises a second coupling device adapted to receive at least a portion of said locking pin when said second end of said shackle portion is coupled to said base.

18. In combination:
    a dashboard-mounted control device of the type typically found in vehicles having a shaft with first and second ends and a hand-grip knob, the shaft being mounted for axial movement relative to said dashboard from an extended position to an unextended position, the shaft having an aperture therethrough; and
    an anti-theft device comprising:
       a locking device adapted for removable coupling about said shaft, said locking device having a base and a shackle portion, the shackle portion having first and second ends adapted for coupling to said base, the base having a first coupling device, the shackle portion having a locking pin formed integrally therewith, the aperture of the shaft being adapted to receive said locking pin, the first coupling device of the base being adapted to receive at least a portion of said locking pin;
       wherein when the shaft is in an extended position and said locking pin is provided through said aperture of said shaft, and when said locking pin is received in said first coupling device, and when said shackle portion is coupled to said base, said locking device substantially prevents axial movement of the shaft to said unextended position.

19. In combination:
    a dashboard-mounted control device of the type typically found in vehicles having a shaft with first and second ends and a hand-grip knob, the shaft being mounted for axial movement relative to said dashboard from an extended position to an unextended position, the shaft having an aperture therethrough; and an anti-theft device comprising:
- a locking device adapted for removable coupling about said shaft, said locking device having a base and a shackle portion, the shackle portion having first and second ends adapted for coupling to said base, the base having a locking pin formed integrally therewith, said aperture of said shaft being adapted to receive said locking pin, said shackle portion having a second coupling device adapted to receive said locking pin;
- wherein when the shaft is in an extended position and said locking pin is provided through said aperture of said shaft, and when said locking pin is received in said second coupling device, and when said shackle portion is coupled to said base, said locking device substantially prevents axial movement of the shaft to said unextended position.

20. In combination:

a vehicular control device including a shaft having a locking pin non-axially extending from the shaft, said shaft being capable of axial movement in inward and outward directions; and a lock for engaging said locking pin and substantially preventing axial movement of said shaft in at least one of said inward and outward directions.

* * * * *